United States Patent [19]

Dronet et al.

[11] Patent Number: 4,512,734

[45] Date of Patent: Apr. 23, 1985

[54] ARRANGEMENT FOR EXTERNALLY AFFIXING OR PLACING BANDEROLES OR STRIPS ON RECEPTACLES

[75] Inventors: Jean-Marc Dronet; Jacques Resseguier, both of Falaise, France

[73] Assignee: Ste d'Application Platique Mecanique et Electronicque Plastimechanique S.A., Falaise, France

[21] Appl. No.: 265,080

[22] Filed: May 19, 1981

[30] Foreign Application Priority Data

May 19, 1980 [FR] France .................. 80 11089

[51] Int. Cl.³ .............................................. B29C 17/00
[52] U.S. Cl. ............................ 425/305.1; 425/302.1; 425/306; 425/513
[58] Field of Search .................... 425/301, 302.1, 304, 425/305.1, 306, 510, 512, 513

[56] References Cited

U.S. PATENT DOCUMENTS 4,335,635  6/1982  Hautemont ............... 425/122 X
4,370,118  1/1983  Dronet ..................... 425/305.1
4,394,115  7/1983  Dronet ..................... 425/122

Primary Examiner—J. Howard Flint, Jr.

[57] ABSTRACT

An arrangement for introducing banderoles or strips into a mold of a heat-forming machine of thermoplastic materials.

The banderoles are obtained by longitudinally and transversely cutting a band being paid out from a feed roller.

The transverse cutting is effected by a knife and the longitudinal cutting is effected by a rotating cutting edge mounted on a cutting wheel. The band is being fed via a pair of feed rollers. The knife and cutting wheel are mounted at a precisely set distance. The circumference of each feed roller and the circumference of the cutting wheel is equal to the length of one banderole. An additional wheel is provided which coacts with the cutting wheel and is in abutting contact therewith. A permanent fixed angular relationship is provided between the drive for the knife, on the one hand, and the drive for the cutting wheel, feed rollers and additional wheel, on the other hand.

7 Claims, 10 Drawing Figures

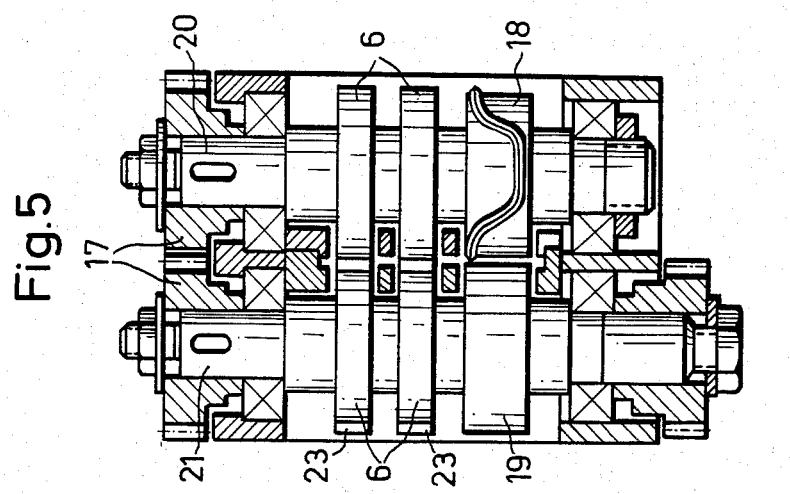
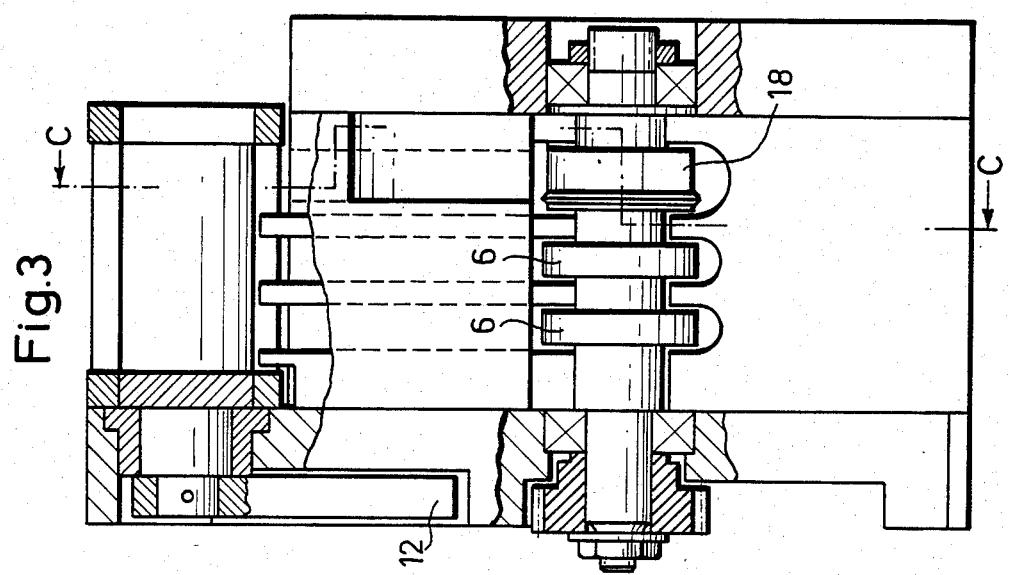
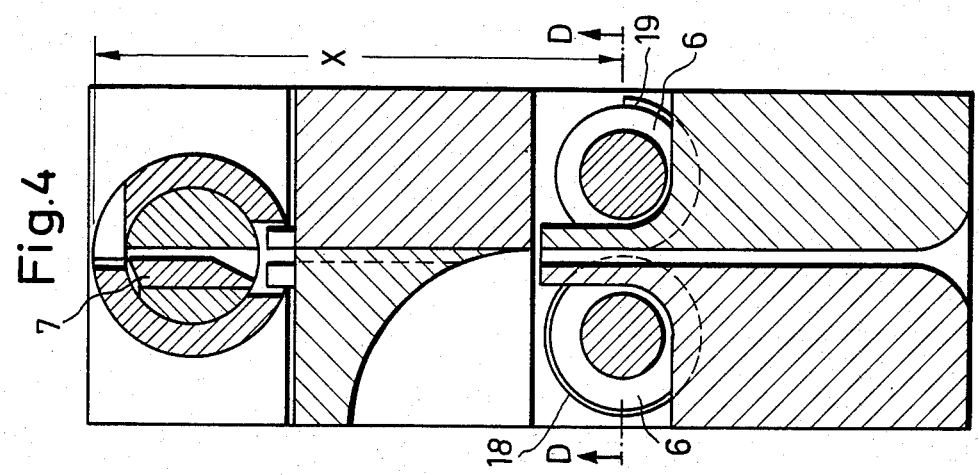

ARRANGEMENT FOR EXTERNALLY AFFIXING OR PLACING BANDEROLES OR STRIPS ON RECEPTACLES

BACKGROUND OF THE INVENTION

The present invention relates to a machine for producing receptacles by heat-forming a thermoplastic material, which machine also has a mechanism for affixing banderoles or strips externally onto the receptacle.

In the modern packaging industry, especially machines for packaging food products, it is already known to affix to receptacles on their lateral walls decorative banderoles or strips which serve to decorate the receptacle. In particular machines are known which successively carry out the forming, filling and the sealing of the receptacles. It is known to introduce the banderoles or strips by automatic mechanisms into the molds in advance of the heat-forming operation. In view of the fact that the banderoles or strips have decorative indicia, designs or inscriptions, it is necessary in those cases, where one operates with continuous bands, to effectuate a convenient marking so that the transverse cutting of the continuous bands into individual banderoles or strips coincides with the respective ends of the decorative markings. This is generally obtained by means of a control mechanism for the transverse cutting which is correlated with the means for entraining the band by means of one or more photoelectric cells.

This problem becomes more complex when it is desired to make pots furnished with banderoles, the longitudinal edges of which are not formed by straight parallel lines, which is the case when at least one of the longitudinal edges must be cut along an irregular pattern or when one wishes to make a cut in the shape of a truncated cone which requires banderole edges in the shape of circular arcs.

It has been proposed to resolve this problem by cutting two longitudinal edges by means of a system of punches and matrixes, but this solution leads to an undesirable large number of complex mechanical arrangements in the machine, which are costly and difficult to maintain.

SUMMARY OF THE INVENTION

The present invention relates to a machine wherein the mechanism for introducing the banderoles or strips into the molds include a guide passage into which the banderole is introduced by means of a lateral slit under the action of a pair of rollers in order to be thereafter cut transversely and transferred into the mold by suitable means such as, for example, a suction mandrel or a piston.

Such devices are disclosed in German Pat. No. 568,834 and French Pat. Nos. 2,034,915; 2,256,013; and 2,340,185. Moreover, a device of this type is also disclosed in the copending and co-assigned U.S. Pat. No. 4,394,115 entitled "IMPROVED FORMING ARRANGEMENT FOR MACHINES MAKING RECEPTACLES OUT OF THERMOPLASTIC MATERIAL", and in our co-assigned application entitled "IMPROVED ARRANGEMENT FOR INTRODUCING BANDEROLES OR STRIPS INTO RECEPTACLES", Ser. No. 265,101 filed May 19, 1981, now U.S. Pat. No. 4,370,118.

It is the general object of this invention to improve the afore-described types of machines so that simple mechanisms, which are inexpensive and provide a secure functioning of the machine, are provided for feeding a banderole from a feed roller, which banderole has at least one longitudinal edge which is not straight. In particular the invention is concerned with providing a mechanism for feeding and mounting banderoles onto conically shaped parts.

The arrangement in accordance with the invention is characterized in that it includes a knife for transversely cutting the banderole which is mounted downstream from an entraining roller, at a fixed distance from the latter, which entraining roller is synchronized so that it stepwise entrains by rotations of 360°, and which is associated with at least one longitudinal cutting wheel which is coaxial with respect to one of the rollers and cooperates with a cylinder which is coaxially disposed with respect to the other roller; said cylinder and cutting wheel having the same external diameter as the entraining roller, which diameter is such that the circumference of the entraining roller, of the cylinder and of the cutting wheel are equal to the length of a cut banderole. An angular permanent fixing is provided between the entraining roller and the control mechanism for the knife and means are provided to ensure that the knife is actuated only after the entraining roller and the cutting wheel associated therewith are in a predetermined angular position.

The arrangement of the invention has the following advantageous features:

(a) The angular position of the roller and the cutting wheel, at which the knife is actuated, is adjustable; it is therefore possible to modify and fix the engagement of the longitudinal cutting with respect to the transverse cutting.

(b) The distance which separates the entraining generatrix and the knife is equal to the length of one banderole.

(c) The knife is actuated during the period of arrest of the stepwise movement of the entraining roller.

(d) The entraining rollers are armed with anti-slip material.

The invention also contemplates the inclusion of the following additional features:

(1) The knife is associated with the entraining roller and the cutting wheel in a unitary block in which a guide passage for the banderoles is provided for each longitudinal cutting wheel; and a curved partition wall for evacuating the waste material has a slit for the passage of the banderole.

(2) For obtaining banderoles of truncated conical shape the transfer means of the member having the guide passage to the mold includes a suction mandrel which is slidably movable with respect to the mold; the diameter of the mandrel is less than that of the small base of the truncated cone formed by the mold.

DESCRIPTION OF THE DRAWINGS

With these and other objects in view, which will become apparent in the following detailed description, the present invention will be clearly understood in connection with the accompanying drawings, in which:

FIG. 3 illustrates schematically in detail an example of the advancing mechanism and the transversel and longitudinal cutting mechanism in accordance with the invention, whereby FIG. 3 is a lateral view, partially in section;

FIG. 4 is a sectional view along line 4—4 of FIG. 3 and FIG. 5 is a sectional view along line D—D of FIG. 4;

DETAILED DESCRIPTION

Figure 1:
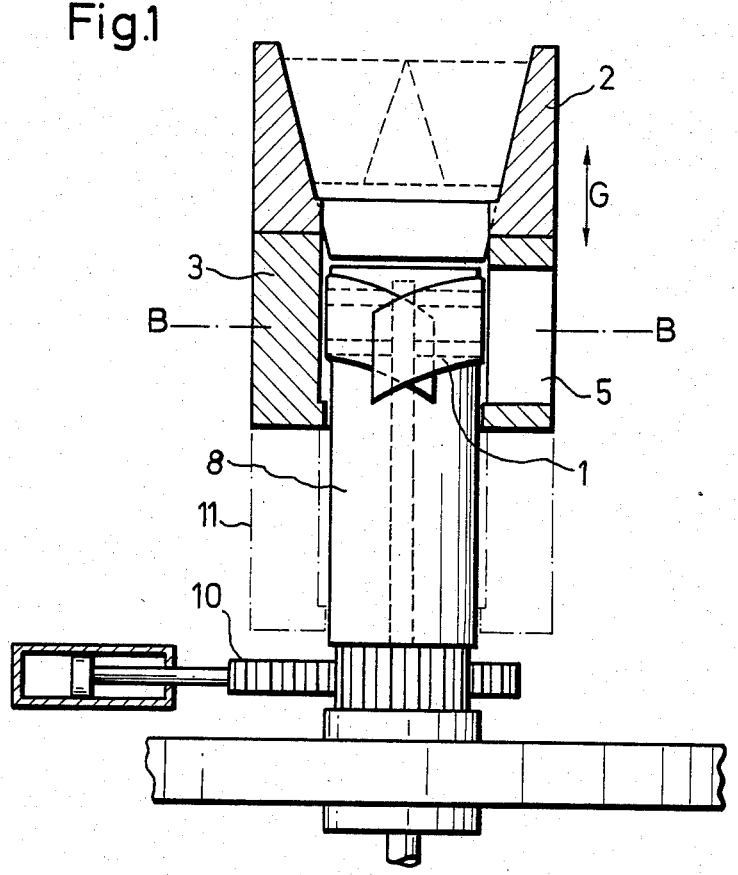
FIG. 1 illustrates in section along line A—A of FIG. 2 the general functional principle of the arrangement in schematic form, and its application to a receptacle in the shape of a truncated cone.
Figure 2:
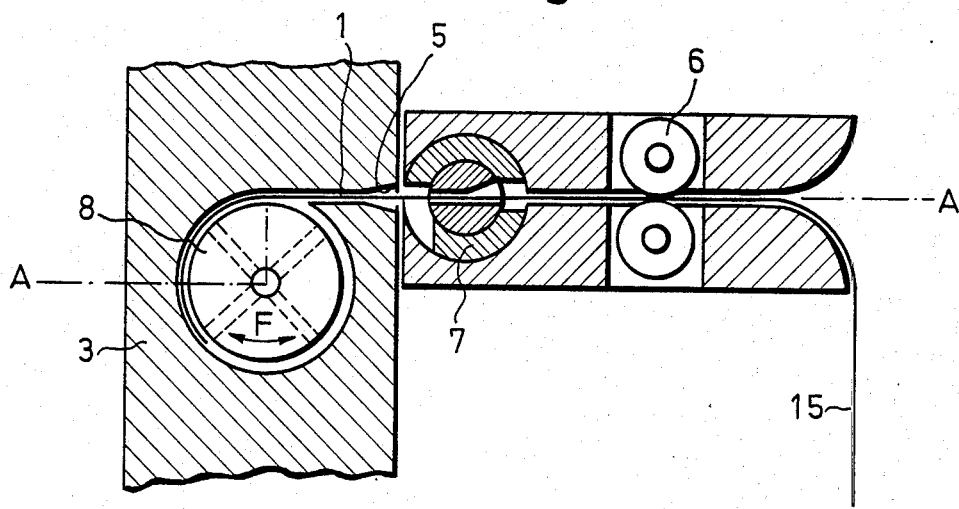
FIG. 2 is a cross-sectional view along line B—B of FIG. 1.
Figure 6:
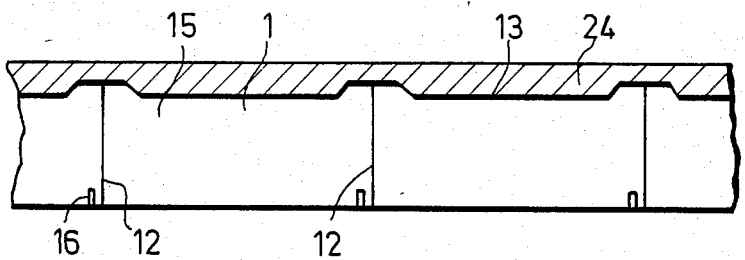
FIGS. 6 to 9 illustrate different forms of banderoles which can be obtained by the arrangement of the invention.
Figure 7:
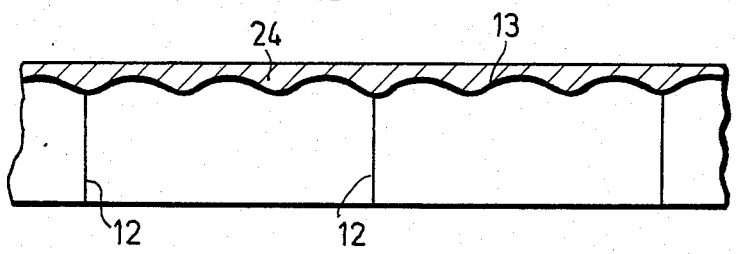

Referring now to FIGS. 1 and 2, it can be noted that the feeding means for introducing the banderoles 1 into the mold 2 is of the type which includes a member 3 having a guide passage into which the band 15 is introduced by means of a lateral passageway 5 by way of the action of the pair of entraining rollers 6; thereafter the introduced band is transversely cut by the knife 7 into banderoles 1 of predetermined length, which are transferred into the mold 2 by any suitable means, for example, by means of a suction mandrel 8 or equivalent means such as a sliding piston which slides longitudinally with respect to the member 3.

In the illustrated embodiment the mandrel 8 is rotatable along the double arrow F, for example by means of engagement of a gear wheel 9 with the gear rack 10, which gear wheel 9 is coaxial with respect to the suction mandrel 8. The assembly of mold 2 and member 3 is slidable along the mandrel 8 between a high position in which the suction zone of the mandrel 8 is disposed in the member 3 (the position illustrated in FIG. 1) and a low position, indicated by dot-dash lines 11, in which the afore-mentioned suction zone is disposed in the mold 2.

Figure 8:
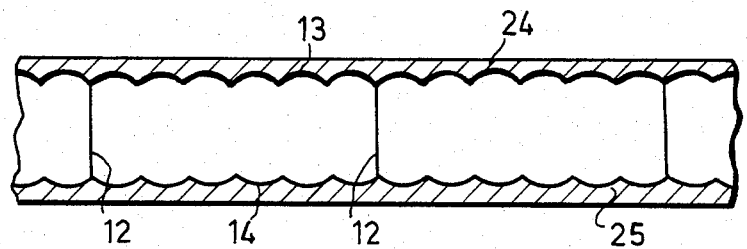
Figure 9:
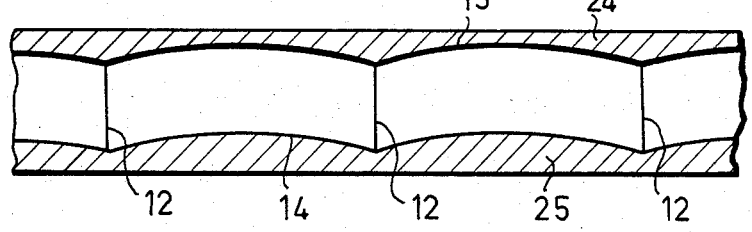

In order to obtain banderoles in accordance with FIGS. 6 to 9, it is necessary to proceed not only to transversely cut the band as is indicated at 12, but also a longitudinal cutting is necessary to achieve one longitudinal edge 13 (see FIGS. 6 and 7) or respectively two longitudinal cuts are necessary to achieve two longitudinal edges 13 and 14 (see FIGS. 8 and 9).

The banderoles which form decorative labels or tags, must have their vertical cuts 12 as well as their longitudinal cuts 13 and 14 effected very carefully in order to achieve the necessary decorative effect.

In accordance with the invention a longitudinal cut 13 or 14 having a rigorously maintained relationship with respect to the transverse cut 12 is obtained by providing entrainment rollers 6, whose movement is synchronized by means of the gearing 17 and which have a diameter such that their circumferences are precisely equal to the length of one banderole 1; one of the shafts 20 or 21, which support the rollers 6, has at least one cutting wheel 18 for longitudinally cutting; the cutting edge of the cutting wheel 18 coacts with a cylinder 19 of the same diameter, which is mounted on the other shaft 21 or 20.

Additionally, an angular permanent fixing is provided by, on the one hand, the shafts 20 and 21 supporting the rollers 6, the cutting wheel 18 and the cylinder 19, and on the other hand, the drive 21 actuating the knife 7 in such a way that the knife 7 can only be actuated when it is in a predetermined position with respect to the shaft 20. The means for such fixed correlation is not illustrated but can be any kind of mechanical means such as a cam linked mechanically to one of the shafts 20 and 21 and acting on the drive 22 or any other equivalent means, for example, electro-mechanical means. Such means are preferably adjustable, for example, by means of an adjusting screw having a micrometric thread, of such a type that a coincidence between the transverse cutting and longitudinal cutting can be finely adjusted.

Preferably the knife 7 is actuated during the arrest of the stepwise entraining wheel 6 which permit a stalling of their action once the wheels 6 have attained the angular predetermined position in which the knives 7 can operate.

While in the known machines the wheels 6 are generally stretch-wheels for which there is contemplated a sliding of the band 15 in order to achieve a stepwise advance, the wheels 6 of the arrangement of the present invention are not designed for any sliding. In order to achieve this at least one wheel of the pair of wheels is armed with a surface, which surface confronts the surface 23, and which surface is provided with anti-slipping and/or sliding means. As a result of the elimination of slippage on the wheels 6, which can be achieved with a surface having a cross-section with outwardly extending hooks, stepwise entrainment of the wheels 6 is calculated to furnish a rotation of 360° C. of the band with each step. Such an arrangement permits an easy resolution of the problem of angularly permanently fixing the cutting wheel at the moment of the action of the cutting knives; each step amounting to 360° C., the arresting of the wheels 6 and cutting wheels 18 taking place at each step at the same angular position. If the action of the knives intervenes at the arrest of the cutting knife, the desired fixing results.

Preferably the distance X (FIG. 4) which separates the contact generatrix of the wheels 6 and the cutting edge of the knife 7, is equal to the length of one banderole 1.

Such arrangement facilitates the adjusting of the initial fixing of the knives 6 by furnishing an exact reference mark for the arresting position of the wheels 6, which position is such that their contact generatrix are disposed on a transverse cutting line 12.

A longitudinal cutting of the type achieved by the arrangement of the invention causes the formation of a waste-band 24 or two wastebands 24 and 25 (FIGS. 6 to 9) and which require the evacuation or disposal of such waste-bands.

Figure 10:
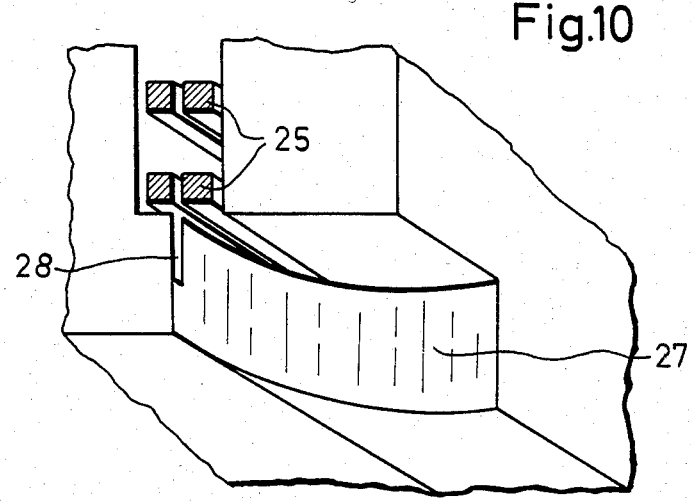
FIG. 10 is a partial view in perspective illustrating a detail of the evacuation means for the waste material.

The invention provides for this purpose that the guide passage for the banderoles 1 includes, at the level of the waste-band 25 and above the height of such waste-band a curved partition wall 27 which causes a lateral deviation of the waste-band 25 through a slot 28 by guiding the remainder of the waste-band along the curved partition wall. This arrangement is illustrated in detail in FIG. 10.

In accordance with another feature of the invention when one is introducing banderoles for parts having a truncated conical shape (FIG. 1) for which the banderoles 1 must be cut to the shape illustrated in FIG. 9 the means for transferring from the member 3 to the mold 2 are constituted by a mandrel of a diameter which is less than that of the small base of the mold 2.

One can observe therefore in a surprising manner that the banderole 1 places itself around the mandrel 8 as is illustrated in FIG. 1 without assuming a helical shape, thereafter it positions itself in place in the mold 2 and assumes, due to its elasticity, the position illustrated in dotted lines when the suction of the mandrel 8 ceases without requiring the intervention of any supplemental means.

The arrangement of longitudinal cutting and for introducing the banderole in accordance with the invention permits therefore to resolve the problem of affixing banderoles to parts of truncated conical shape in a particularly simple manner.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. In a heat-forming machine for making receptacles from thermoplastic material, an improved arrangement for introducing cut banderoles or strips 1 into molds 2, via a member 3 having at least one guide passage, the improvement comprising:

band feeding means for feeding a band 15 through a lateral slit 5 in said member 3, said band feeding means include a pair of rollers 6, transverse cutting means 7 operatively connected to said pair of rollers 6 for cutting said band 15 into banderoles 1 of predetermined length;

longitudinal cutting means 18, 19 operatively connected to said transverse cutting means 7, said operative connection between the transverse and longitudinal cutting means being rigorously precisely maintained by means of a pair of gear wheels 17 which synchronously engage each other and by selecting the diameter of the wheels 6 to be such that their circumference is exactly equal to the length of the banderole 1;

said pair of feed rollers 6 being coaxially mounted on a pair of parallel feed shafts 20, 21, at least one of said feed shafts coaxially supports thereon the cutting wheel 18 of the cutting means 18, 19 for longitudinally cutting said band 15 and at least one of said feed shafts is operatively connected to the device of said transverse cutting means 7; the cutting edge of the cutting wheel 18 being disposed on a cylindrical surface of said cutting wheel 18 which is of the same diameter as the diameter of the wheels 6; said cutting edge coacts with a cylindrical surface 19 of an other wheel which is coaxially mounted on the other feed shaft, which cylindrical surface is of the same diameter as said cutting wheel 18;

the shafts 20, 21 supporting the wheels 6, the cutting wheel 18 and the cylinder 19, on the one hand, and on the other hand, the drive 21 for the transverse cutting means 7 being selectively fixed at a predetermined angular relationship so that the transverse cutting means 7 are cutting only when the feed shaft 20 is in a predetermined angular position.

2. In a heat-forming machine for making receptacles from thermoplastic material, the improved arrangement for introducing cut banderoles or strips as set forth in claim 1, wherein the angular relationship between transverse cutting means 7 and longitudinal cutting means 18, 19 is adjustable.

3. In a heat-forming machine for making receptacles from thermoplastic material, the improved arrangement for introducing cut banderoles or strips as set forth in claim 2, wherein said member 3 having said guide passage has an entraining generatrix, the distance separating said transverse cutting means from the upstream end of said entraining generatrix being equal to the length of one banderole 1.

4. In a heat-forming machine for making receptacles from thermoplastic material, the improved arrangement for introducing cut banderoles or strips as set forth in claim 3, wherein said feed rollers 6 are rotated by said feed shafts 20, 21 in stepwise fashion, said transverse cutting means 7 being actuated while said feed rollers 6 are at standstill.

5. In a heat-forming machine for making receptacles from thermoplastic material, the improved arrangement for introducing cut banderoles or strips as set forth in claim 4, wherein said feed rollers 6 are at least partially clad with an anti-slip material.

6. In a heat-forming machine for making receptacles from thermoplastic material, the improved arrangement for introducing cut banderoles or strips as set forth in claim 5, wherein said band feeding means include a guide passage disposed between said pair of feed rollers and said transverse cutting means, a curved partition 27 extending from said guide passage, which partition is adapted to guide away from said guide passage at least one longitudinal waste-band 24, 25 which has been cut by said longitudinal cutting means 18, 19.

7. In a heat-forming machine for making receptacles from thermoplastic material, the improved arrangement for introducing cut banderoles or strips as set forth in claim 6, including transfer means for transferring said banderole 1 from the guide passage of said member 3 into said mold 2, said transfer means including a suction mandrel which is reciprocally slidably mounted in said member 3 relative to said mold 2, the diameter of said suction mandrel being less then the small base of a truncated cone which is the shape of said mold 2.

* * * * *